US012614240B2

(12) United States Patent
Shao et al.

(10) Patent No.: US 12,614,240 B2
(45) Date of Patent: Apr. 28, 2026

(54) METHOD FOR SMART GAS PIPELINE NETWORK INSPECTION AND INTERNET OF THINGS SYSTEM THEREOF

(71) Applicant: CHENGDU QINCHUAN IOT TECHNOLOGY CO., LTD., Chengdu (CN)

(72) Inventors: Zehua Shao, Chengdu (CN); Yong Li, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 530 days.

(21) Appl. No.: 18/153,327

(22) Filed: Jan. 11, 2023

(65) Prior Publication Data

US 2023/0143654 A1    May 11, 2023

(30) Foreign Application Priority Data

Dec. 15, 2022    (CN) ......................... 202211616065.X

(51) Int. Cl.
| | |
|---|---|
| *G06Q 50/06* | (2024.01) |
| *F17D 5/00* | (2006.01) |
| *G06F 16/22* | (2019.01) |
| *G06Q 10/0631* | (2023.01) |
| *G06Q 10/20* | (2023.01) |

(52) U.S. Cl.
CPC ............. *G06Q 50/06* (2013.01); *F17D 5/005* (2013.01); *G06F 16/2264* (2019.01); *G06Q 10/06316* (2013.01); *G06Q 10/20* (2013.01)

(58) Field of Classification Search
CPC ............... G06F 16/2264; F17D 5/005; G06Q 10/06316; G06Q 10/20
See application file for complete search history.

(56) References Cited

U.S. PATENT DOCUMENTS

| | | | |
|---|---|---|---|
| 7,406,402 B1 | 7/2008 | Waitkus, Jr. | |
| 9,217,649 B1 | 12/2015 | Dror et al. | |
| 2015/0307273 A1 | 10/2015 | Lyman | |
| 2017/0109631 A1 | 4/2017 | Cheng et al. | |
| 2020/0191316 A1* | 6/2020 | Du ..................... | G06Q 10/0635 |

OTHER PUBLICATIONS

Abinaya et al., IoT Based Smart Garbage and Waste Collection Bin, International Journal of Advance Research, Ideas and Innovations in Technology, 4(2): 522-524, 2018.

* cited by examiner

*Primary Examiner* — Deirdre D Hatcher
(74) *Attorney, Agent, or Firm* — METIS IP LLC

(57) ABSTRACT

The embodiments of the present disclosure provide a method for smart gas pipeline network inspection, implemented on a smart gas pipeline network security management platform based on an Internet of Things system for smart gas pipeline network inspection, and the method comprising: obtaining a gas pipeline network distribution; determining at least one inspection sub-area based on the gas pipeline network distribution; determining, based on the at least one inspection sub-area, an inspection plan for each of the at least one inspection sub-area, the inspection plan at least including an inspection frequency.

18 Claims, 5 Drawing Sheets

200

100

200

400

410

411  Gas pipeline network distribution

412  At least one inspection personnel station

413  Second pipeline network graph

420  Second pipeline network graph

421  Sub-graph

422  Sub-graph

423  Sub-graph

430  Determining the at least one inspection sub-area based on the at least one second pipeline network sub-graph

500

METHOD FOR SMART GAS PIPELINE NETWORK INSPECTION AND INTERNET OF THINGS SYSTEM THEREOF

CROSS-REFERENCE TO RELATED DISCLOSURES

This application claims the priority of the Chinese application No. 202211616065.X filed on Dec. 15, 2022, the entire content of which is incorporated herein by reference.

TECHNICAL FIELD

The present disclosure relates to the technical field of gas pipeline network inspection, in particular to a method for smart gas pipeline network inspection and an Internet of Things system thereof.

BACKGROUND

Damage to a gas pipeline network will not only cause economic losses to a gas company but also affect lives of urban residents, and even threaten personal safety of people in severe cases. Therefore, the gas company needs to arrange inspection personnel to inspect the gas pipeline network to find problems in time and solve the problems as soon as possible. However, due to a large coverage area of the gas pipeline network in the city, it is easy to cause missed inspections and re-inspections during inspections by the inspection personnel, resulting in low inspection efficiency and poor inspection results.

On this basis, it is hoped that a method for smart gas pipeline network inspection and an Internet of Things system thereof can be provided to improve the inspection efficiency and inspection result.

SUMMARY

The embodiments of the present disclosure provide a method for smart gas pipeline network inspection, implemented based on an Internet of Things system for smart gas pipeline network inspection. The method comprises: obtaining a gas pipeline network distribution; determining at least one inspection sub-area based on the gas pipeline network distribution; determining, based on the at least one inspection sub-area, an inspection plan for each of the at least one inspection sub-area, the inspection plan at least including an inspection frequency.

One of the embodiments of the present disclosure provides an Internet of Things system for smart gas pipeline network inspection, the system includes: a smart gas user platform, a smart gas service platform, a smart gas pipeline network security management platform, a smart gas sensor network platform, and a smart gas sensor network platform. gas object platform; wherein the smart gas object platform is configured to obtain a gas pipeline network distribution, and transmit the gas pipeline network distribution to the smart gas pipeline network security management platform through the smart gas sensor network platform; the smart gas pipeline network security management platform is configured to determine at least one inspection sub-area based on the gas pipeline network distribution; determine, based on the at least one inspection sub-area, an inspection plan for each of the at least one inspection sub-area, inspection plan including at least inspection frequency; and the smart gas service platform is configured to feed back the inspection plan to the smart gas user platform.

One of the embodiments of the present disclosure provides a non-transitory computer-readable storage medium storing computer instructions, wherein after reading the computer instructions in the storage medium, a computer executes the method for smart gas pipeline network inspection according to the above descriptions.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
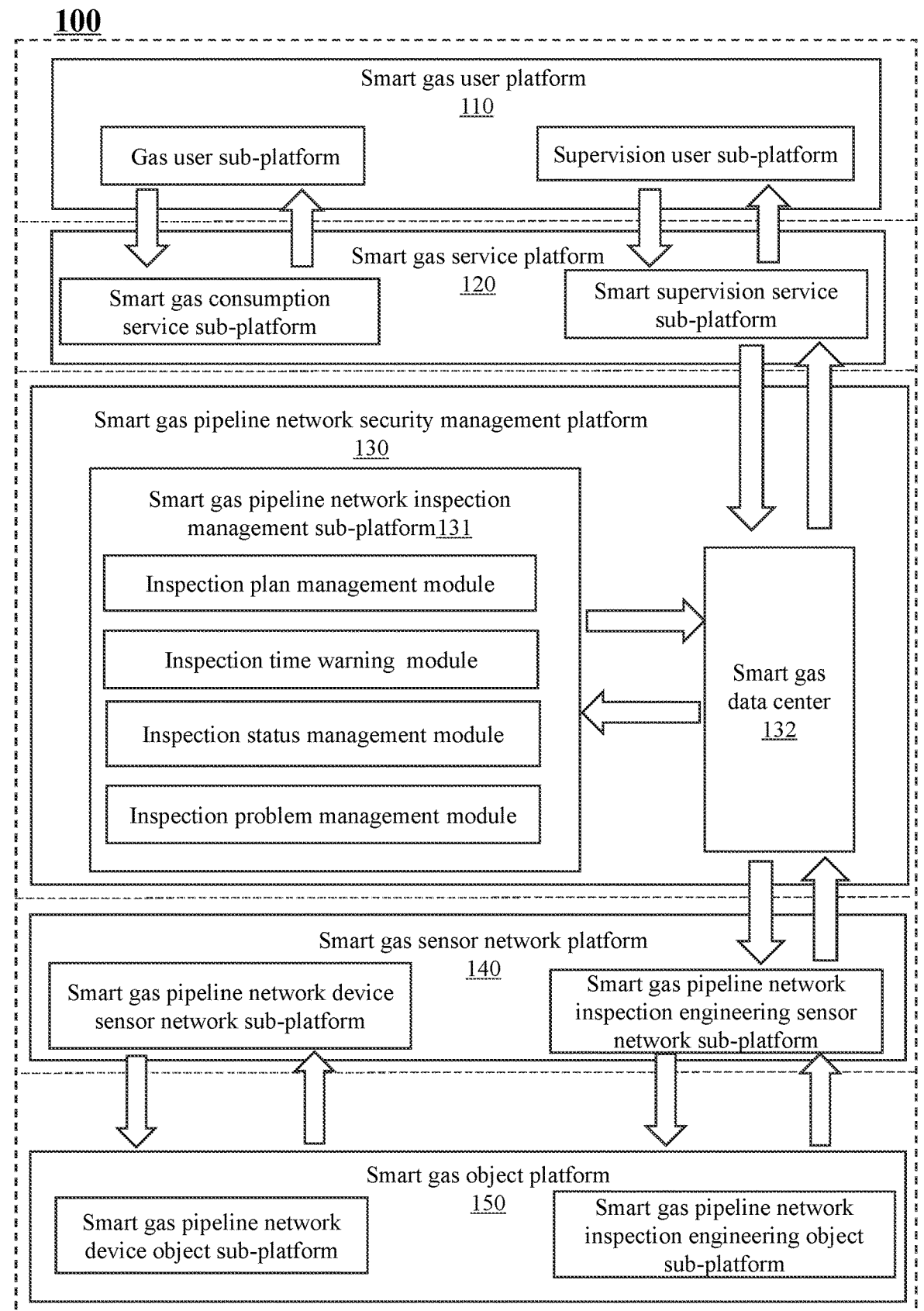
FIG. 1 is a schematic diagram of an Internet of Things system for smart gas pipeline network inspection according to some embodiments of the present disclosure.

The technical solutions of the present disclosure embodiments will be more clearly described below, and the accompanying drawings need to be configured in the description of the embodiments will be briefly described below. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the front or rear operation is not necessarily performed in order to accurately. Instead, the operations may be processed in reverse order or simultaneously. Moreover, one or more other operations may be added to the flowcharts. One or more operations may be removed from the flowcharts.

FIG. 1 is a schematic diagram of an Internet of Things system 100 for smart gas pipeline network inspection according to some embodiments of the present disclosure. The Internet of Things system 100 for smart gas pipeline network inspection involved in the embodiments of the present disclosure will be described in detail below. It should be noted that the following embodiments are only used to explain the present disclosure, and do not constitute a limitation on the present disclosure.

As shown in FIG. 1, the Internet of Things system 100 for smart gas pipeline network inspection may include a smart gas user platform 110, a smart gas service platform 120, a smart gas pipeline network security management platform 130, a smart gas sensor network platform 140, and a smart gas object platform 150.

The smart gas user platform 110 may be a user-led platform used to obtain user requirements and feed back information to users. In some embodiments, the smart gas user platform 110 may be configured as a terminal device. For example, the smart gas user platform 110 may be an intelligent electronic device that realizes data processing and data communication, such as a desktop computer, a tablet computer, a laptop computer, a mobile phone, etc.

In some embodiments, the smart gas user platform 110 may include a gas user sub-platform and a supervision user sub-platform. The gas user sub-platform is oriented to gas users, and may be used to receive gas-related data and gas pipeline network inspection reminder information (such as an inspection time, etc.) sent by a smart gas consumption service sub-platform, and send gas-related data query instructions to the smart gas consumption service sub-platform. The supervision user sub-platform is oriented to supervision users (for example, users in a safety supervision department), and may be used to receive gas pipeline network inspection management information (such as an inspection plan, etc.) sent by a smart supervision service sub-platform, and send gas pipeline network inspection management information query instructions to the smart supervision service sub-platform.

The smart gas service platform 120 may be a platform for receiving and transmitting data and/or information. For example, the smart gas service platform 120 may be configured to receive the gas pipeline network inspection management information uploaded by a smart gas data center 132 of the smart gas pipeline network security management platform 130, and send the gas pipeline network inspection management information to the smart gas user platform 110. In some embodiments, the smart gas service platform 120 may be configured to receive query instructions (e.g., the gas-related data query instructions, the gas pipeline network inspection management information query instructions, etc.) issued by the smart gas user platform 110, and send the query instructions to the smart gas data center 132 of the smart gas pipeline network security management platform 130.

In some embodiments, the smart gas service platform 120 may include the smart gas consumption service sub-platform and the smart supervision service sub-platform. The smart gas consumption service sub-platform may be used to receive the gas-related data and the gas pipeline network inspection reminder information uploaded by the smart gas data center 132, and send the gas-related data and the gas pipeline network inspection reminder information to the gas user sub-platform. The smart gas consumption service sub-platform may also be used to receive the gas-related data query instructions issued by the gas user sub-platform, and send the gas-related data query instructions to the smart gas data center 132. The smart supervision service sub-platform may be used to receive the gas pipeline network inspection management information uploaded by the smart gas data center 132, and transmit the gas pipeline network inspection management information to the supervision user sub-platform. The smart supervision service sub-platform may also be used to receive the gas pipeline network inspection management information query instructions sent by the supervision user sub-platform, and send the gas pipeline network inspection management information query instructions to the smart gas data center 132.

The smart gas pipeline network security management platform 130 may refer to a platform that coordinates and harmonizes the connection and cooperation between various functional platforms, gathers all information of the Internet of Things, and provides functions of perception management and control management for the Internet of Things operation system. For example, the smart gas pipeline network security management platform 130 may be configured to receive relevant data (e.g., a gas pipeline network distribution, pipeline features, etc.) of pipeline network devices sent by the smart gas sensor network platform 140, perform inspection management on the gas pipeline network, and determine the inspection plan.

In some embodiments, the smart gas pipeline network security management platform 130 may include a smart gas pipeline network inspection management sub-platform 131 and a smart gas data center 132. The smart gas pipeline network inspection management sub-platform 131 may include an inspection plan management module, an inspection time warning module, an inspection status management module, and an inspection problem management module.

The inspection plan management module may be used to set and adjust the inspection plan of the pipeline network device, and send the inspection plan based on the smart gas data center 132 through the smart gas pipeline network inspection engineering sensor network sub-platform to the inspection engineering object sub-platform. The inspection plan management module may also send the inspection plan that may affect gas consumption of the users to the gas user sub-platform through the smart gas consumption service sub-platform through the smart gas data center 132.

The inspection time management module may be used to automatically arrange the inspection plan that not be executed according to the inspection time, and prompt and alarm based on a preset time threshold. In some embodiments, the management personnel may directly generate an inspection reminder instruction through the inspection time warning module, and send the inspection reminder instruction to the smart gas pipeline network inspection engineering object sub-platform through the smart gas pipeline network inspection engineering sensor network sub-platform based on the smart gas data center 132.

The inspection status management module may be used to check the implementation of the inspection plan for the pipeline network device and the implementation of a historical inspection plan.

The inspection problem management module may be used to manage inspection, remote processing, and message sending of inspection problems.

In some embodiments, the smart gas data center 132 may be configured to receive information such as the gas pipeline network distribution, the pipeline features, and other information uploaded by the smart gas sensor network platform 140, and send the data to the smart gas pipeline network security management sub-platform for analysis and processing. When processed by the smart gas pipeline network security management sub-platform, the data may be sent back to the smart gas data center 132, and the smart gas data center 132 may summarize and store the processed data and upload the processed data to the smart gas service platform 120. The processed data then may be transmitted to the smart gas user platform 110 via the smart gas service platform 120. In some embodiments, the smart gas data center 132 may also be configured to receive query instructions (e.g., the gas-related data query instructions, the gas pipeline network inspection management information query instructions, etc.) issued by the smart gas service platform 120, and send the query instructions to the smart gas sensor network platform 140.

The smart gas sensor network platform 140 may refer to a platform for processing, storing and transmitting data and/or information. For example, the smart gas sensor network platform 140 may be configured to receive data and/or information obtained by the smart gas object platform 150, such as the gas pipeline network distribution, pipeline features, etc., and transmit the data and/or information to the smart gas data center 132. In some embodiments, the smart gas sensor network platform 140 may be configured as a communication network and gateway.

In some embodiments, the smart gas sensor network platform 140 may include a smart gas pipeline network device sensor network sub-platform and a smart gas pipeline network inspection engineering sensor network sub-platform. The smart gas pipeline network device sensor network sub-platform may be used to receive relevant data of the pipeline network device, such as the gas pipeline network distribution, pipeline features, etc., and send the relevant data to the smart gas data center 132. The smart gas pipeline network device sensor network sub-platform may also be used to receive relevant data query instructions of the pipeline network device issued by the smart gas data center 132, and send the relevant data query instructions to the smart gas pipeline network device object sub-platform. The smart gas pipeline network inspection engineering sensor sub-platform may be used to receive the inspection-related information (such as the inspection plan, inspection reminder instructions, etc.) issued by the smart gas data center 132, and send the inspection-related information to the smart gas pipeline network inspection engineering object sub-platform. The smart gas pipeline network inspection engineering sensor sub-platform may also be used to receive the execution feedback of the inspection-related information uploaded by the smart gas pipeline network inspection engineering object sub-platform, and send the execution feedback to the smart gas data center 132.

The smart gas object platform 150 may be a functional platform for obtaining data and/or information related to pipeline network objects. For example, the smart gas object platform 150 may be used to obtain relevant data of the pipeline network device, and transmit the relevant data to the smart gas data center 132 through the smart gas sensor network platform 140. In some embodiments, the smart gas object platform 150 may be configured as various types of devices, such as pipeline network devices (e.g., pipelines, gate stations, etc.) and inspection engineering-related devices (e.g., alarm device, etc.).

In some embodiments, the smart gas object platform 150 may include a smart gas pipeline network device object sub-platform and a smart gas pipeline network inspection engineering object sub-platform. The smart gas network object sub-platform may be used to receive the relevant data query instruction of the pipeline network device transmitted by the smart gas sensor network platform 140. After obtaining the relevant data of the pipeline network device, the smart gas network object sub-platform may be used to upload the relevant data to the smart gas data center 132 through the smart gas sensor network platform 140. The smart gas network inspection engineering object sub-platform may be used to receive the inspection-related information transmitted by the smart gas sensor network platform 140, perform a corresponding inspection operation on the pipeline network device, and feed back an execution result to the smart gas data center 132 through the smart gas sensor network platform 140.

In some embodiments of the present disclosure, the Internet of Things system for smart gas pipeline network inspection may be constructed through the smart gas user platform, the smart gas service platform, the smart gas pipeline network security management platform, the smart gas sensor network platform, and the smart gas object platform, which may form a closed loop of smart gas pipeline network inspection management information operation among the gas pipeline network device, pipeline network inspection personnel, gas operators and gas users, thereby realizing the informatization and intelligence of the pipeline network inspection management and making the management more efficient.

It should be noted that the above descriptions of the Internet of Things system 100 for smart gas pipeline network inspection and its various components may be only for the convenience of description, and may not limit the description to the scope of the illustrated embodiments. It may be understood that for those skilled in the art, after understanding the principle of the device, various components may be combined arbitrarily, or a subsystem may be formed to connect with other components without departing from the principle.

Figure 2:
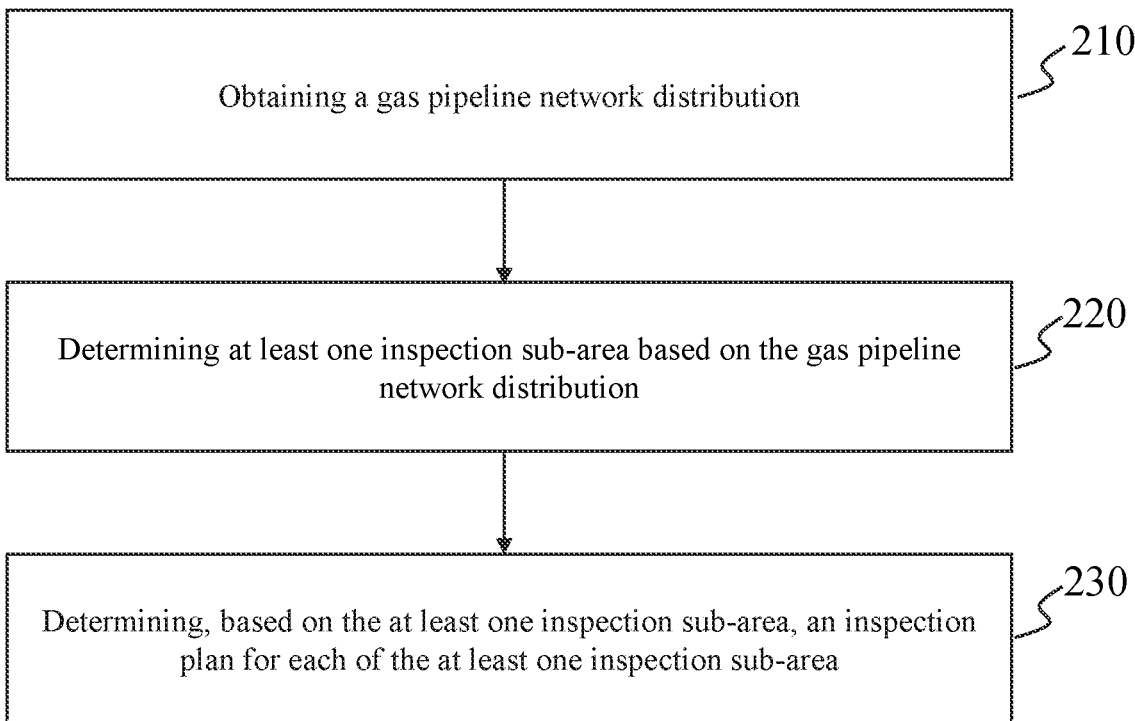
FIG. 2 is a flowchart illustrating an exemplary method for smart gas pipeline network inspection according to some embodiments of the present disclosure.

FIG. 2 is a flowchart illustrating an exemplary method for smart gas pipeline network inspection according to some embodiments of the present disclosure.

In some embodiments, process 200 may be executed by the smart gas pipeline network security management platform 130. As shown in FIG. 2, process 200 may include the following steps.

Step 210, obtaining a gas pipeline network distribution.

The gas pipeline network distribution may refer to distribution data of the gas pipeline network, such as a coverage area of the gas pipeline network, node locations of the gas pipeline network, and a number of nodes of the gas pipeline network.

The gas pipeline network distribution may be obtained based on various manners. In some embodiments, the smart gas data center of the smart gas pipeline network security management platform 130 may obtain the gas pipeline network distribution based on the smart gas pipeline network device object sub-platform of the smart gas object platform. The smart gas pipeline network device object sub-platform may be configured with a monitoring device for the pipeline network device to obtain the pipeline network distribution. For example, the smart gas pipeline network device object sub-platform may use a Global Positioning System (GPS) to obtain information such as the coverage area of the gas pipeline network and the node locations of the gas pipeline network, etc.

Step 220, determining at least one inspection sub-area based on the gas pipeline network distribution.

The inspection sub-area may refer to any area in an area where the gas pipeline network is located. For example, if distribution areas of the gas pipeline network include area A, area B, and area C, these three areas may be considered as inspection sub-areas.

The inspection sub-area may be determined in various ways. In some embodiments, the inspection sub-areas may be divided according to a preset rule, for example, according to physical areas (e.g., city divisions). The preset rule may be a preset division rule, and may be determined based on historical experience, algorithms, or the like.

In some embodiments, at least one inspection personnel station may also be determined based on the gas pipeline network distribution, and then at least one inspection sub-area may be determined based on the gas pipeline network distribution and the at least one inspection personnel station.

The inspection personnel station may refer to a parking point and a starting point of the inspection personnel during the inspection. The inspection personnel station may be a gas pipeline network node (such as a gate station, a gas storage station, etc.), or a site set up on any location of the pipeline of the gas pipeline network (such as a site established at the midpoint of the pipeline, or the like).

The inspection personnel station may be determined in various ways. In some embodiments, based on the gas pipeline network distribution, several inspection personnel stations may be randomly generated according to preset requirements. The preset requirements may be preset requirements. For example, the preset requirements may be that a distance between two pipeline network nodes being greater than a preset distance threshold, or the like. Specifically, based on the gas pipeline network distribution, a certain pipeline network node may be used as a base point, and points whose distances from the pipeline network node are greater than the preset distance threshold may be used as a first batch of inspection stations. It should be noted that a relative distance between any two inspection stations in the determined first batch of inspection stations needs to be not less than the preset distance threshold. Then the first batch of inspection stations may be taken as the base points, and other points whose distance is greater than the preset distance threshold may be taken as the second batch of inspection stations. Proceed in this way, until the inspection stations in the gas pipeline network coverage area are determined. The base point may be understood as the basic point or the starting point.

In some embodiments, the first pipeline network graph may also be constructed based on the gas pipeline network distribution. According to the first pipeline network graph, through the probability determination model, based on the nodes of the first pipeline network graph and/or the edges of the first pipeline network graph, the probability that the nodes and/or edges of the first pipeline network graph are the inspection personnel station may be output. Based on the output of the nodes of the first pipeline network graph and the edges of the first pipeline network graph, at least one inspection personnel station may be determined. For the specific content of how to determine the at least one inspection personnel station based on the gas pipeline network distribution by using the first pipeline network graph and the probability determination model, please refer to FIG. 3 and related descriptions thereof.

In some embodiments, the inspection sub-areas may be preliminarily divided according to a preset rule based on the gas pipeline network distribution, and then the inspection sub-areas may be determined in combination with the location of the inspection personnel station. For example, the inspection sub-areas may be preliminarily divided (e.g., area A, B, and C) by physical area (e.g., city division), if there is no inspection personnel station in area A, but there are inspection personnel stations in areas B and C, area A may be merged into an area (e.g., area C) where the nearest inspection personnel station is located from area A, then area B and (area A+ area C) may be determined as the final two inspection sub-areas. It should be noted that this manner is only used as an example, and does not limit the division manner of the preset distance.

In some embodiments, the second pipeline network graph may also be constructed based on the gas pipeline network distribution and at least one inspection personnel station. According to the second pipeline network graph, at least one second pipeline network sub-graph may be determined by a preset sub-graph segmentation manner. Then based on the at least one second pipeline network sub-graph, at least one inspection sub-area may be determined. For the specific content of how to determine the at least one inspection sub-area based on the gas pipeline network distribution and the at least one inspection personnel station using the second pipeline network graph and the preset sub-graph segmentation manner, please refer to FIG. 4 and related descriptions thereof.

In some embodiments of the present disclosure, based on the gas pipeline network distribution, the at least one inspection personnel station may be determined, and then based on the gas pipeline network distribution and the at least one inspection personnel station, the at least one inspection sub-area may be determined, which can ensure that each inspection sub-area has at least one inspection personnel station, thereby ensuring the normal inspection of the inspection area.

Step 230, determining, based on the at least one inspection sub-area, an inspection plan for each of the at least one inspection sub-area.

The inspection plan may refer to a manner that the inspection personnel should take when inspecting the gas pipeline network, including but not limited to an inspection cycle, an inspection-related operation, etc. For example, when the relevant data of the pipeline network device fluctuates abnormally, a corresponding inspection plan may be a new plan obtained by extending the inspection cycle and changing the inspection route based on an original inspection plan. In some embodiments, the inspection plan may include at least an inspection frequency.

The inspection frequency may refer to times of inspections of a certain inspection sub-area within a certain time period. For example, the inspection frequency may be 10 times/day, 20 times/week, etc. The inspection frequency may be determined manually and randomly, or may be determined based on historical data and other manner. For example, the inspection frequency may be determined based on an accident frequency of the gas pipeline network in the historical accident data of a certain inspection sub-area, the higher the accident frequency, the higher the corresponding inspection frequency may be.

In some embodiments, the smart gas data center may transmit the relevant data of the pipeline network device to the smart gas pipeline network inspection management sub-platform, and the smart gas pipeline network inspection management sub-platform may determine the inspection plan in various ways. For example, the smart gas pipeline network inspection management sub-platform may match the relevant data (such as the gas pipeline network distribution, the pipeline features, etc.) of the pipeline network device in the inspection sub-area with the historical pipeline network data, and then take the historical pipeline network data with the highest similarity as the reference data, and a historical reference inspection plan corresponding to the historical pipeline network data as the inspection plan in the inspection sub-area. The historical pipeline network data may refer to a collection of historical related data of the pipeline network device, such as a historical gas pipeline network distribution, historical pipeline features, and other data. The reference data may refer to the historical pipeline network data with the highest similarity to the related data of a current pipeline network device. The historical reference inspection plan may be an inspection plan adopted when the pipeline network device operates under parameters of the reference data.

In some embodiments, the inspection plan may further include an inspection route; and the inspection sub-area may also include an inspection personnel station and at least one inspection point.

In some embodiments, it is also possible to determine a route that traverses each of at least one inspection point from the inspection personnel station in the inspection sub-area as an inspection route and determine the inspection plan of the inspection sub-area based on the inspection route.

The inspection point may refer to a destination of the inspection. The inspection point may be a certain segment of the pipeline in the pipeline network, a node at an opposite end of the pipeline, or a certain point on the pipeline, etc.

Inspection points may be determined in several ways. In some embodiments, inspection points may be determined based on historical inspection data. For example, the top 10 historical inspection points ranked from high to low in the times of inspections in the historical inspection data may be used as the inspection points. The historical inspection point may refer to a pipeline network node or pipeline that used to be the inspection point. In some embodiments, the inspection point may also be determined based on an actual situation. For example, the node at the opposite end of an abnormal pipeline may be used as the inspection point. The abnormal pipeline may refer to a certain segment of the gas pipeline network whose pipeline features exceed a preset feature threshold, such as a pipeline whose air pressure exceeds a preset air pressure threshold, a pipeline whose maintenance times exceed a preset maintenance threshold, etc.

The inspection route may refer to a route that the inspection personnel should walk during an inspection. For example, the inspection route may be a route from the pipeline network node A to the pipeline network node B. As another example, the inspection route may be a route from the pipeline network node A, through the pipeline network node B, and then to the middle end of the pipeline C, or the like.

The inspection route may be determined based on various manners, such as randomly determining the inspection route. In some embodiments, the inspection route may be generated according to a preset manner. For example, the top 10 historical inspection points ranked from high to low in the historical inspection data may be taken as the inspection point, and the inspection point farthest from the other inspection points may be taken as the starting point. According to a principle of shortest inspection route distance, a route formed by the other inspection points with a series connection may be regarded as the inspection route. The principle of inspection route distance may be determined based on a program algorithm, or the like.

In some embodiments, each inspection point in the at least one inspection point may have an inspection priority value;

and the inspection route may be determined based on the inspection priority value of the each inspection point. For the specific content of the inspection priority value and how to determine the inspection route based on the inspection priority value of each inspection point, please refer to FIG. 5 and related description thereof.

In some embodiments, an inspection plan for inspecting the sub-areas may be determined based on the inspection route. For example, after the inspection route is determined, the inspection frequency may be determined according to the pipeline features corresponding to the inspection points in the inspection route, and then the inspection plan may be determined. The pipeline features may be related to the features of the pipeline itself, such as a diameter of the pipeline, a service life of the pipeline, or the like. Specifically, when it is found that the service life of the pipeline corresponding to a certain inspection point in the inspection route exceeds an age threshold, the inspection frequency may be increased on the basis of the original inspection plan to obtain a new inspection plan. The age threshold may refer to a preset age limit, which may be determined based on historical experience, simulation tests, and other manner.

In some embodiments of the present disclosure, determine the inspection route and then determine the inspection plan based on the inspection route, which can not only reduce the workload of the inspection personnel, but also be conducive to the unified scheduling and management of the inspection personnel, defining the scope of responsibility and saving the management cost.

In some embodiments of the present disclosure, one or more inspection sub-areas and the inspection plan of each of the inspection sub-areas may be determined based on the gas pipeline network distribution using a pipeline network graph, a probability determination model, preset sub-graph segmentation, and other methods, which can make inspection plan more scientific and reasonable, beneficial to improve the inspection efficiency and inspection effect, thereby finding problems in time, preventing the problems in advance or dealing with the problems as soon as possible, and reducing the losses of gas companies.

Figure 3:
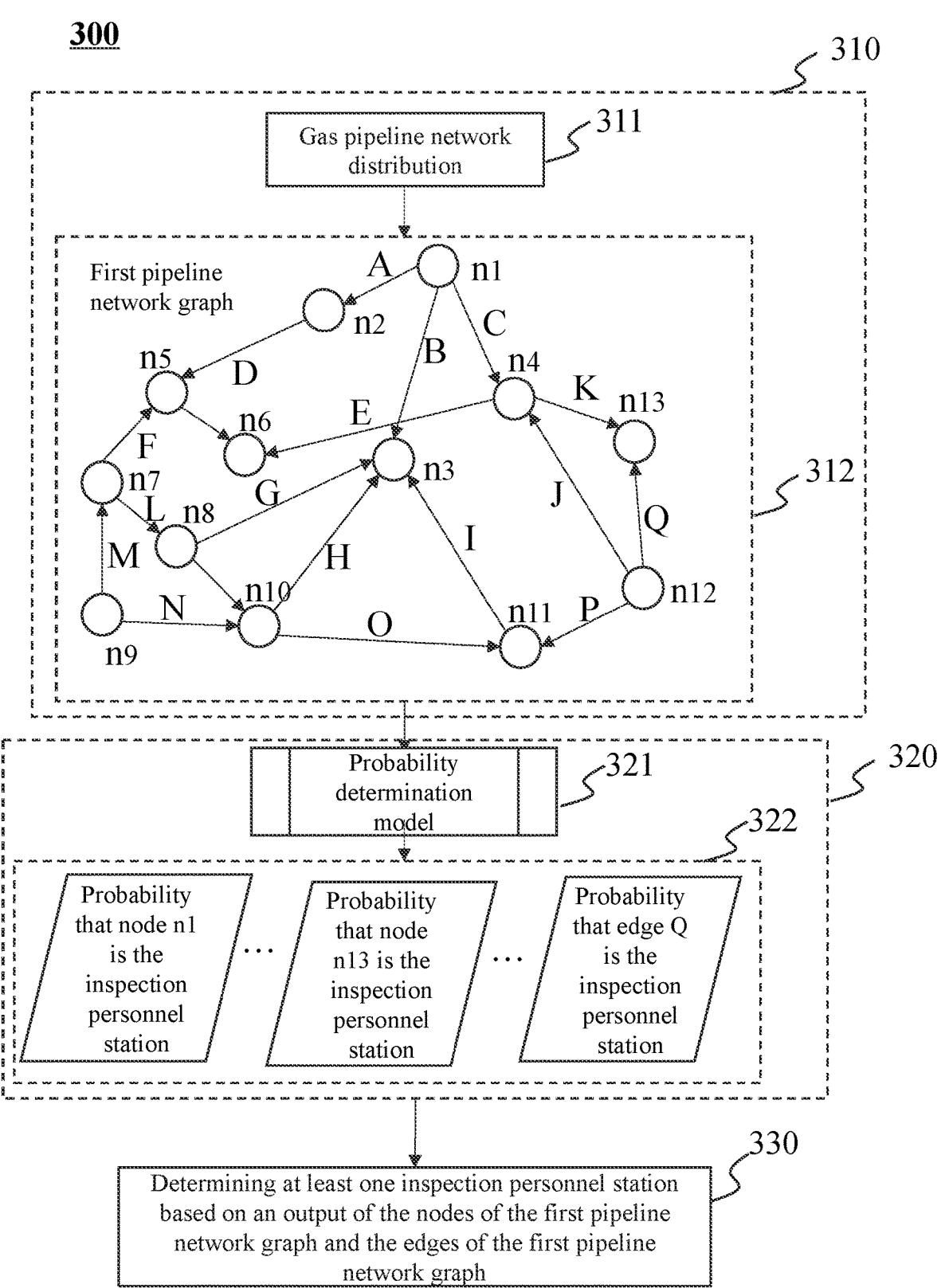
FIG. 3 is a flowchart illustrating an exemplary process for determining at least one inspection personnel station according to some embodiments of the present disclosure.

FIG. 3 is a flowchart illustrating an exemplary process for determining at least one inspection personnel station according to some embodiments of the present disclosure.

In some embodiments, process 300 may be executed by the smart gas pipeline network security management platform 130. As shown in FIG. 3, the process 300 may include the following steps.

Step 310, constructing a first pipeline network graph 312 based on the gas pipeline network distribution 311, wherein nodes of the first pipeline network graph 312 correspond to the pipeline network branches in the gas pipeline network distribution 311; edges of the first pipeline network graph 312 correspond to the pipelines in the gas pipeline network distribution 311; and each edge of the first pipeline network graph corresponds to a pipeline connecting two network pipeline branches.

The first pipeline network graph 312 may refer to a graph determined based on the information of the gas pipeline network distribution 311, which may represent the distribution information of the gas pipelines, gate stations, gas storage stations, and other pipeline network devices in various areas of the city in the gas pipeline network distribution 311. In some embodiments, the smart gas pipeline network security management platform 130 may obtain the information of the gas pipeline network distribution 311 from the smart gas data center 132 based on the smart gas pipeline network inspection management sub-platform to construct the first pipeline network graph 312.

In some embodiments, the smart gas pipeline network security management platform 130 may construct the first pipeline network graph 312 based on the gas pipeline network distribution 311.

The nodes of the first pipeline network graph 312 may be used to represent pipeline network branches in the gas pipeline network distribution 311, for example, the inflection point of the gas pipeline, the gate station, the gas storage station, etc. The nodes of the first pipeline network graph 312 may be determined according to a preset node rule. For example, the nodes of the first pipeline network graph 312 may be determined according to a number, density, and importance of the pipeline inflection points, gate stations, and gas storage stations in the gas pipeline network distribution 311 and an area to which the pipeline inflection points, gate stations, and gas storage stations belong, or may be preset based on experience.

In some embodiments, the nodes in the first pipeline network graph 312 may include a node n1, a node n2, a node n12, or the like.

The features of the node of the first network graph 312 may include various information. In some embodiments, the features of node of the first pipeline network graph 312 may include a node type corresponding to the node, and the node type may include a plurality of types, such as a gate station type, a gas storage station type, a pipeline inflection point type, or the like. The features of the node of the first pipeline network graph 312 may also include other information about the corresponding node, such as times of historical inspections, a failure rate, or the like. In some embodiments, the features of the node of the first pipeline network graph 312 may further include whether the node is an inspection personnel station. For the specific content of the inspection personnel station, please refer to FIG. 2 and related descriptions thereof.

The edges of the first network graph 312 may be used to represent the pipelines in the gas network distribution 311. In some embodiments, the edges of the first pipeline network graph 312 may connect two nodes of the first pipeline network graph 312, which may represent a relationship between the two nodes of the first pipeline network graph 312, for example, neighbor relationship, distance relationship, etc. It may be understood that, there may be a plurality of gas pipelines between the two nodes (e.g., two gas storage stations) of the first pipeline network graph 312. Merely by way of example, a certain gas storage station has a plurality of gas pipelines (e.g., 2 pipelines, 3 pipelines) laid at different angles or directions, and the plurality of gas pipelines converge at a same gas storage station. In this case, in the first pipeline network graph 312, there may be a plurality of edges (e.g., 2 edges, 3 edges) connected between the two nodes corresponding to the two gas storage stations according to the number of gas pipelines.

In some embodiments, the edges in the first pipeline network graph 312 may include edge A, edge B, edge Q, or the like. In some embodiments, the edges of the first pipeline network graph 312 may be directed edges, and the directions of the edges may indicate the transmission directions of the gas. For example, edge A may represent that gas is transmitted from node n1 to node n2.

The edge features of the first pipeline network graph 312 may include various information. In some embodiments, the edge features of the first pipeline network graph 312 may include the length of the gas pipeline corresponding to the edge, for example, 50 m. The edge features of the first pipeline network graph 312 may also include other information, such as the usage duration of the gas pipeline, the times of historical inspections, the failure rate, or the like. In some embodiments, the edge features of the first pipeline network graph 312 may further include whether the edge is an inspection personnel station.

Step 320, outputting, based on the nodes of the first pipeline network graph 312 and/or the edges of the first pipeline network graph 312 through a probability determination model 321, a probability 322 that the nodes of the first pipeline network graph 312 and/or the edges of the first pipeline network graph 312 are the inspection personnel station.

The inspection personnel station may refer to a place where the inspection personnel may park, and the inspection personnel may start from a certain inspection personnel station to carry out the inspection of the gas pipeline. The inspection personnel station may be set at the gate station, gas storage station, or near the pipeline where the gas pipeline network is distributed. In some embodiments, the inspection personnel station may correspond to a node or edge of the first pipeline network graph, that is, the plurality of nodes or edges of the first pipeline network graph 312 may be set as inspection personnel stations. It should be noted that, when a certain edge of the first pipeline network graph 312 is set as an inspection personnel inspection point, the inspection personnel inspection point may be represented based on a midpoint of the edge or in other forms.

In some embodiments, the inspection personnel station may be determined based on a preset requirement. For example, at least one inspection personnel station may be randomly determined, and the at least one inspection personnel station is used as a dot. The node or edge which is outside the preset radius threshold (for example, 200 m) corresponding the dot and closest to the at least one inspection personnel station may be selected as the new inspection personnel station.

The probability that each node or each edge in the first pipeline network graph 312 is set as the inspection personnel station may be different. In some embodiments, the smart gas pipeline network security management platform 130 may determine the probability that each node or each edge in the first pipeline network graph 312 is set as the inspection personnel station through the probability determination model 321.

The probability determination model 321 may refer to a model for determining the probability that the node and/or the edge of the first pipeline network graph is the inspection personnel station. In some embodiments, the probability determination model 321 may be a trained machine learning model. For example, the probability determination model 321 may include a recurrent neural network model, a convolutional neural network, or other custom model structures, or the like, or any combination thereof.

In some embodiments, the probability determination model 321 may be a trained graph neural network model. As shown in FIG. 3, the smart gas pipeline network security management platform 130 may input the first pipeline network graph 312 into the probability determination model 321, and process the first pipeline network graph 312 through the probability determination model 321, and obtain the probability 322 that each node and/or each edge of the first pipeline network graph is the inspection personnel station outputted by the probability determination model 321 based on the nodes and/or edges of the first pipeline network graph 312. For example, the probability determination model may output the probability that node n1 is the inspection personnel station based on the node n1, output the probability that node n3 is the inspection personnel station based on the node n3, output the probability that edge Q is the inspection personnel station based on the edge Q, etc.

In some embodiments, the probability determination model 321 may be obtained by training a plurality of sample pipeline network graphs with labels. The sample pipeline network graphs may be a plurality of historical pipeline network graphs, and the labels may be determined based on whether the nodes or edges in the sample pipeline network graphs are historical inspection personnel stations. For example, if a node or edge is a historical inspection personnel station, the value of the label corresponding to the node or edge is 1, otherwise it is 0, etc. In some embodiments, the labels may also be determined based on the historical inspection information of the nodes or edges in the sample pipeline network graphs. For example, the lower the failure rate of the historical inspection, the higher the probability of the node or edge being determined as the inspection personnel station. The labels may be labeled manually, or the like.

When training the initial probability determination model, the smart gas pipeline network security management platform 130 may input each sample pipeline network graph into the probability determination model, and through the processing of the probability determination model, and obtain the probability value of each node and edge as the inspection personnel station outputted by the probability determination model based on the each node and edge in the sample pipeline network graph. The smart gas pipeline network security management platform 130 may construct a loss function based on the label of each sample pipeline network graph and the output of the probability determination model, and iteratively update the parameters of the probability determination model based on the loss function, and obtain a trained probability determination model until the preset conditions are satisfied and the training is completed. The preset conditions may be that the loss function is less than a threshold, convergence, or the training cycle reaches a threshold.

In some embodiments, the label setting manner may also be: in the sample pipeline network graph, the label of the node or edge that is actually set as the inspection personnel station may be set to 1, and the label values of other nodes/edges are set based on a preset attenuation degree. For example, the label values of other nodes/edges may be set to values in a range of [0,1].

For example, the label values of the other nodes/edges may be determined based on a label value algorithm of L=1-k* degree, where, k represents the preset attenuation degree (for example, 0.1), and degree represents a neighbor degree or distance (for example, 1, 2) of the other nodes or edges and the inspection personnel station. Exemplarily, if a node is adjacent to the inspection personnel station (the neighbor degree is 1), the label value of the node may be L=1-0.1*1=0.9.

In some embodiments, if a certain node or edge obtains a plurality of node labels based on different inspection personnel stations, a final label value of the node or edge may be determined based on the corresponding plurality of node labels, such as the final label value may be an average value or a weighted sum of the plurality of node labels, etc.

In some embodiments of the present disclosure, due to the large number of the nodes and edges, the training efficiency of the probability determination model may be improved by setting the label when training the probability determination model by the attenuation degree.

Step 330, determining at least one inspection personnel station based on an output of the nodes of the first pipeline network graph 312 and the edges of the first pipeline network graph 312.

In some embodiments, after the first pipeline network graph 312 is processed by the probability determination model 321, the smart gas pipeline network security management platform 130 may determine the at least one inspection personnel station according to preset rules based on the probability values of the inspection personnel stations output based on the nodes and edges of the first pipeline network graph. Merely by way of example, X (e.g., 5 or 10) nodes and/or edges of the inspection personnel stations with the largest probability value may be used as the inspection personnel stations, wherein the distance between these X nodes and/or edges may be larger than the preset distance threshold, so that the distribution of inspection personnel station may be more uniform.

In some embodiments, the smart gas pipeline network security management platform 130 may sort (e.g., sort in a descending order) based on the probability values of inspection personnel stations, select preset top M nodes/edges as candidate inspection personnel stations, and randomly select N candidate inspection personnel stations that satisfy a preset constraint condition as the target inspection personnel stations among the M candidate inspection personnel station. The preset constraint condition may be that among the N candidate inspection personnel stations, the distance (e.g., the length of the gas pipeline) between any two candidate inspection personnel stations is greater than a preset distance threshold (e.g., 200 m).

As shown in FIG. 3, after the probability determination model 321 processed the first pipeline network graph 312 and output probability values of the inspection personnel station based on the nodes and edges of the first pipeline network graph 312, the probability values may be sorted in descending order, and three inspection personnel stations meeting the preset constraint conditions may be determined as node n1, node n9, and node n12. Descriptions here are examples only, and are not intended to be limiting. For example, the inspection personnel stations may also be 4, 5, etc.

The number N of inspection personnel stations may be determined based on actual needs or in various suitable ways. For example, the number of inspection personnel stations may be determined based on the proportion (e.g., 10%) of the total number of the nodes and edges in the first pipeline network graph 312, the number of divided areas of the gas pipeline network distribution 311, the number of actual inspection personnel, or the like, or any combination thereof. For example, if the number of the actual inspection personnel is 20, the number of the inspection personnel stations may be set to be less than 20 (e.g., 18).

In some embodiments, the number of the inspection personnel stations may be determined based on an average value of the sub-graph complexity of the plurality of sub-graphs after the pipeline network sub-graph is divided. The pipeline network sub-graph corresponds to the inspection area, and the greater the complexity of the sub-graph, the larger the number of nodes/edges representing the sub-graph. It may be understood that the greater the complexity of each sub-graph in the plurality of sub-graphs, the larger the average value of the sub-graph complexity of all the sub-graphs correspondingly, and the greater the inspection workload of the inspection personnel.

In some embodiments, an average threshold value may be preset, and the smart gas pipeline network security management platform 130 may determine the corresponding number of the inspection personnel stations by increasing the number of the inspection personnel stations to make the average value of the sub-graph complexity in the plurality of sub-graphs lower than the preset average value threshold. For example, the number of current inspection personnel stations is 3, and the number of nodes and edges of each sub-graph in the determined 3 sub-graphs is relatively large (for example, exceeding a preset number threshold), that is, the average value of the sub-graph complexity is large. At this time, the number of the current inspection personnel stations may increase (for example, add one in total), then the number of sub-graphs may increase (for example, add one in total). At the same time, the number of nodes and edges of each sub-graph may decrease correspondingly, that is, the sub-graph complexity of each sub-graph may decrease correspondingly. When the average value of sub-graph complexity of all sub-graphs is less than the preset average threshold or the sum of the number of nodes and edges of each sub-graph is less than the preset number threshold, the number of the current inspection personnel stations may stop increasing, and the number of the current inspection personnel stations may be determined as the final number of inspection personnel stations.

Figure 4:
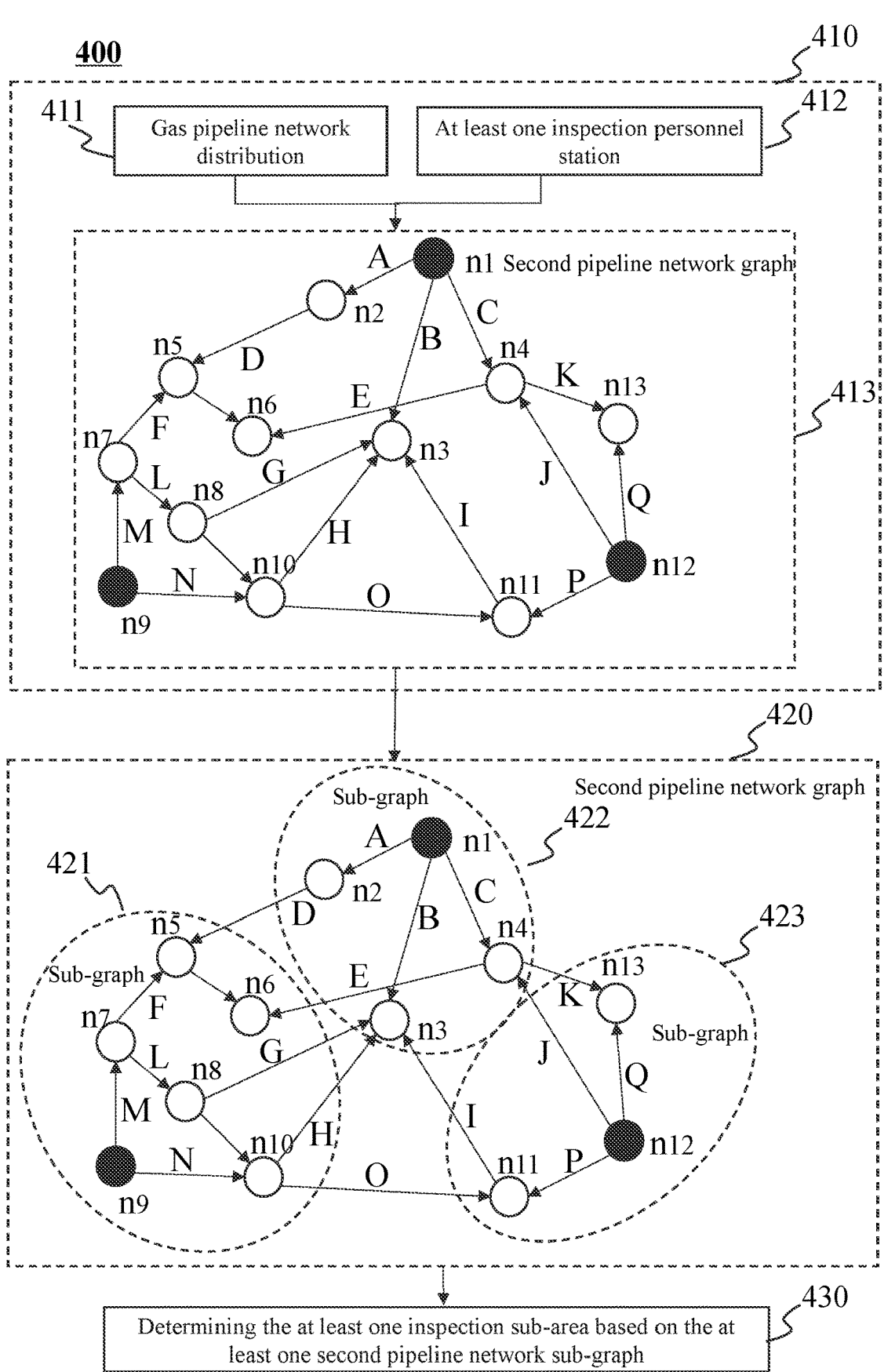
FIG. 4 is a flowchart illustrating an exemplary process for determining at least one inspection sub-area according to some embodiments of the present disclosure.

For more information on the pipeline network sub-graph and the sub-graph complexity, please refer to FIG. 4 and related descriptions thereof.

In some embodiments of the present disclosure, setting the number of the inspection personnel stations in combination with the workload of inspection can effectively reduce the pressure of inspection, and make the method for determining the inspection personnel stations more user-friendly.

In some embodiments of the present disclosure, the probability of the inspection personnel station may be determined by the probability determination model, and then the inspection personnel station may be determined based on the probability of the inspection personnel station, which can make the result more accurate, and improve the determination efficiency of the inspection personnel station at the same time.

FIG. 4 is a flowchart illustrating an exemplary process for determining at least one inspection sub-area according to some embodiments of the present disclosure.

In some embodiments, process 400 may be performed by the smart gas pipeline network security management platform 130. As shown in FIG. 4, process 400 may include the following steps.

Step 410, constructing a second pipeline network graph 413 based on the gas pipeline network distribution 411 and the at least one inspection personnel station 412.

The second pipeline network graph 413 may refer to a graph determined based on the gas pipeline network distribution 411 and the information of at least one inspection personnel station 412, which may represent the distribution information of the gas pipelines, gate stations, gas storage stations, and other pipeline network devices in the gas pipeline network distribution and the inspection personnel stations in various areas of the city. In some embodiments, the smart gas pipeline network security management platform 130 may obtain the information of the gas pipeline network distribution 411 and the at least one inspection personnel station 412 from the smart gas data center 132 based on the smart gas pipeline network inspection management sub-platform to determine the second pipeline network graph 413.

In some embodiments, the smart gas pipeline network security management platform 130 may construct the second pipeline network graph 413 based on the gas pipeline network distribution 411 and the at least one inspection personnel station 412. The second pipeline network graph 413 may include inspection personnel stations (i.e., solid nodes): node n1, node n9, and node n12, non-inspection personnel stations (e.g., hollow nodes): node n2, node n3, node n4, etc., and edges: edge A, edge B, edge C, etc. Please refer to FIG. 3 for features of nodes and edges.

It should be noted that when the inspection personnel station is an edge, the inspection personnel station may be set as the midpoint or each of other preset points of the edge, among the features of the inspection personnel station, the station type may be set to "gas pipeline", and other features of the original edge may be set as the features (such as historical inspection times, failure rate, etc.) of the inspection personnel station. In addition, the original edge may be divided into two edges, and the features of the two edges may also change accordingly. For example, if the inspection personnel station is set as the midpoint of an edge, the length value in the features of the original edge is L, then the length value in the features of the two divided edges may be adjusted to L*1/2.

Step 420, determining at least one second pipeline network sub-graph by a preset sub-graph segmentation manner based on the second pipeline network graph 413.

The second pipeline network sub-graph may refer to a graph composed of at least some nodes and/or edges in the second pipeline network graph 413.

In some embodiments, the smart gas pipeline network security management platform 130 may determine at least one second pipeline network sub-graph of the second pipeline network graph 413 based on the physical planning or administrative planning of the city area. For example, if the city includes area A, area B, area C, etc., the smart gas pipeline network security management platform 130 may correspondingly divide the second pipeline network graph 413 into three second pipeline network sub-graphs including a second pipeline network sub-graph corresponding to the A area, a second pipeline network sub-graph corresponding to the B area, and a second pipeline network sub-graph corresponding to the C area.

In some embodiments, the smart gas pipeline network security management platform 130 may perform a segmentation processing on the second pipeline network graph 413 based on a preset sub-graph segmentation manner to determine the at least one second pipeline network sub-graph.

In some embodiments, the smart gas pipeline network security management platform 130 may perform a plurality of rounds of iterative segmentation processing on the second pipeline network graph 413 based on the preset sub-graph segmentation manner, and finally determine at least one second pipeline network sub-graph. As shown in FIG. 4, the finally determined second pipeline network sub-graph may be a sub-graph 421, a sub-graph 422, and a sub-graph 423. The smart gas pipeline network security management platform 130 may be provided with an iteration counter for recording the time or iteration round including a current iteration, and recording nodes and/or edges divided into the second pipeline network sub-graph in each round of iterations. For example, the time/iteration round of t is 2 when a certain node is divided into a certain second pipeline network sub-graph. Each round of iterative processing may include the following contents.

The preset sub-graph segmentation manner may include the following steps S1 to S5.

Step S1, determining at least one initial second pipeline network sub-graph based on the station nodes of the second pipeline network graph 413, wherein each of the at least one initial second pipeline network sub-graph includes a station node.

The initial second pipeline network sub-graph may refer to a second pipeline network sub-graph obtained when the second pipeline network graph 413 is segmented in each iteration. In some embodiments, the smart gas pipeline network security management platform 130 may use each inspection personnel station in the at least one inspection personnel station 412 as a start node or base node of the corresponding at least one initial second pipeline network sub-graph.

As shown in FIG. 4, the station nodes in the second pipeline network graph 413 include node n1, node n9, and node n12, that is, three initial second pipeline network sub-graphs may be determined, and each initial second pipe network sub-graph at least includes a corresponding station node. For example, the sub-graph 421 includes the station node n9. It may be understood that, the number of inspection personnel stations may determine the number of initial second pipeline network sub-graphs. For example, the above-mentioned three inspection personnel stations may determine that the number of initial second pipe network sub-graphs may be three.

Step S2, using the pipeline network nodes of the second pipeline network graph 413 as nodes to be allocated, and selecting a target node from the nodes to be allocated based on a preset screening manner.

The nodes to be allocated may refer to nodes of the second pipeline network sub-graph that have not been divided into the initial second pipeline network sub-graph.

The target node may refer to a node to be allocated that is selected to be divided into the initial second pipeline network sub-graph.

In some embodiments, the smart gas pipeline network security management platform 130 may select at least one node from the nodes to be allocated as a target node based on a preset strategy. For example, several nodes to be allocated near the inspection personnel station (for example, less than a preset distance threshold) may be selected as target nodes based on a random selection strategy.

In some embodiments, the smart gas pipeline network security management platform 130 may select the target node from the nodes to be allocated based on a preset screening manner.

The preset screening manner may be to select the target node based on the current priority values of the nodes to be allocated. The current priority value is related to a first distance between the node and the sub-graph with a smallest current sub-graph complexity and related to a second distance between the previous target node and the node.

The priority value may be used to determine a probability value that the node to be allocated is selected as the target node. The priority value may be a value in the interval [0, 1], e.g., 0.8. The larger the priority value, the more preferentially to determine the initial second pipeline network sub-graph to which the node to be allocated belongs. The priority value may also be in other representations, such as 1st grade, 2nd grade, 3rd grade, etc. In some embodiments, the smart gas pipeline network security management platform 130 may determine the priority value of each node to be allocated based on the first distance between the node to be allocated and the sub-graph with a smallest current sub-graph complexity and the second distance between the previous target node and the node to be allocated.

The sub-graph complexity may refer to the complexity of the current initial second pipeline network sub-graph. The sub-graph complexity may be a number, such as 0.8, or 5. The larger the number, the higher the sub-graph complexity. The sub-graph complexity may be determined based on the number of nodes and edges of the current initial second pipeline network sub-graph. Merely by way of example, the sub-graph complexity may be equal to the sum of the number of nodes and edges of the sub-graph.

In some embodiments, the first distance may be determined based on the distance between the current node to be allocated and the base node (i.e., the inspection personnel station of the initial second pipe network sub-graph) of the initial second pipe network sub-graph with the smallest current sub-graph complexity. For example, the first distance may be determined based on the sum of the lengths of the edges corresponding to the shortest path connecting the current node to be allocated and the base node.

As shown in FIG. 4, if the initial second pipe network sub-graph with the smallest complexity of the current sub-graph is sub-graph 421, the first distance between the node n5 to be allocated and the base node n9 of the sub-graph 421 may be determined based on the sum of the lengths of edge M and edge F. The length of edge M may be determined by the length feature value (for example, 200 m) in the features of edge M, and the same is true for edge F.

In some embodiments, the second distance may be determined based on the length sum of the edges corresponding to the shortest path connecting the current node to be allocated and the previous target node. The previous target node may be a target node divided into the initial second pipeline network sub-graph in the previous round of sub-graph segmentation processing at last. For example, node n7 is used as the target node in the previous round of sub-graph segmentation processing, and the node to be allocated in current round of sub-graph segmentation processing is node n5, then the second distance corresponding to node n5 is the length of edge F.

In some embodiments, the smart gas network security management platform 130 may further determine the initial second network sub-graph with the smallest sub-graph complexity based on the sub-graph complexity of each initial second network sub-graph, and determine the priority value of each node to be allocated based on the first distance and the second distance of the each node to be allocated. The smaller the first distance, the larger the priority value. The larger the second distance, the larger the priority value. In some embodiments, the smart gas pipeline network security management platform 130 may determine the first priority value based on the first distance of the node to be allocated, determine the second priority value based on the second distance of the node to be allocated, and then determine the final priority value of the node to be allocated based on the average of the first priority value and the second priority value of the node to be allocated.

In some embodiments, the smart gas pipeline network security management platform 130 may sort (e.g., in descending order) the priority values of the nodes to be allocated, and select the node to be allocated with the largest priority value as the target node.

In some embodiments of the present disclosure, the preset screening manner may help balance the complexity of each second pipeline network sub-graph, and prevent the sizes of the second pipeline network sub-graphs from being unbalanced.

Step S3, determining an initial second pipeline network sub-graph to which the target node belongs based on a target function value of each initial second pipeline network sub-graph corresponding to the target node.

The target function value may be used to determine a probability value that the target node screened in step S2 is finally divided into a certain initial second pipeline network sub-graph in the at least one initial second pipeline network sub-graph. The target function value may be related to the sub-graph complexity of the initial second pipeline network sub-graph and the first distance between the target node and the initial second pipeline network sub-graph.

In some embodiments, the target function may be a preset algorithm or formula. Exemplarily, the target function value F may be k1*d1+k2*d2, where, k1 and k2 are preset coefficients. For example, k1 is 0.5, k2 is 0.3. d1 is the sub-graph complexity, which may represent the complexity of the initial second pipeline network sub-graph into which the target node is to be divided; and d2 is the first distance between the target node and the initial second pipeline network sub-graph into which the target node is to be divided.

In some embodiments, the smart gas pipeline network security management platform 130 may determine the function value when the target node is divided into each initial second pipeline network sub-graph correspondingly based on the foregoing manner and determine the initial second network sub-graph corresponding to the minimum target function value F to which the target node is divided.

In some embodiments, the target function value may also be related to the increment of the variance value of the inspection priority values of nodes and edges in the initial second pipe network sub-graph after the target node is divided into the initial second pipe network sub-graph. The larger the increment of the variance value, the smaller the target function value may be. For example, the initial target function value may be determined based on the foregoing manner, the adjustment value of the initial target function value may be determined based on the increment of the variance value, and the target function value may be finally determined based on the initial target function value and the adjustment value.

It may be understood that the inspection priority values of each node and each edge in the initial second pipeline network sub-graph may be different. With the increase of the rounds of iteration, the number of the nodes and edges in each initial second pipeline network sub-graph may also increase. Correspondingly, the increment of the variance value of the inspection priority values of each node and each edge of the initial second pipeline network sub-graph of the current iteration and the previous iteration may have a fluctuation. When the fluctuation is smaller, it indicates that the inspection priority values of each node and each edge in the initial second pipeline network sub-graph may be closer, the uncertainty in the subsequent actual inspection route or inspection sequence may be greater, and the error may also be larger. Otherwise, when the fluctuation is larger, it indicates that the difference between the inspection priority values of each node and each edge in the initial second pipeline network sub-graph may be larger, and the subsequent determination of the actual inspection route or the inspection sequence may be clear, and the error may be smaller.

S4, determining a new target node and repeating the above operations until the initial second pipeline network sub-graphs to which all the nodes to be allocated belong are determined.

The new target node may refer to a node to be allocated screened by the current round of iterative sub-graph segmentation processing after the previous round of sub-graph segmentation processing is completed. For the specific screening manner, please refer to the scheme of the afore-mentioned step S2.

In some embodiments, the smart gas pipeline network security management platform 130 may repeat the operations from step S1 to step S3 in each round of iteration, and gradually divide the un-allocated nodes and edges in the second pipeline network graph into the initial second pipeline network. Until all the nodes to be allocated in the second pipeline network graph are allocated into the initial second pipeline network sub-graph to which they belong, the iteration ends.

It should be noted that when two nodes to be allocated (such as nodes n2 and n5 in FIG. 4) connected by an edge (such as edge D in FIG. 4) in the second pipe network graph are allocated to two different second pipe network sub-graphs (such as sub-graph 422 and sub-graph 421 in FIG. 4), edge D may belong to both second pipe network sub-graphs. In this case, the smart gas pipeline network security management platform 130 may mark or prompt the edge D. When inspection personnel inspects the inspection sub-areas corresponding to sub-graph 422 and sub-graph 421, the gas pipeline corresponding to the edge D may be inspected by the inspection personnel in the inspection sub-area corresponding to sub-graph 422 or sub-graph 421. In some embodiments, the smart gas pipeline network security management platform 130 may also determine the sub-graph to which the edge D belongs based on the direction of the edge D, such as allocating the edge D to the sub-graph where the arrow start point is located, that is, the inspection personnel in the inspection sub-area corresponding to the sub-graph 422 may be responsible for the inspection of the edge D, etc. In some embodiments, other manners may also be adopted, such as random allocation, etc.

In step S5, using the each initial second pipeline network sub-graph after foregoing operations are completed as a final second pipeline network sub-graph for determining a corresponding inspection sub-area.

As shown in FIG. 4, when the iteration is terminated, all nodes and edges in the second pipeline network graph 413 may be divided, and then the nodes and edges contained in the final three second pipeline network sub-graphs may be determined, such as the sub-graph 421, the sub-graph 422, and the sub-graph 423.

It should be noted that the preset sub-graph segmentation manner may include a segmentation processing by nodes, by edges, etc. The above-mentioned preset sub-graph segmentation manner takes the segmentation processing by nodes as an example, which is not intended to be limited.

Step 430, determining the at least one inspection sub-area based on the at least one second pipeline network sub-graph.

The inspection sub-area may refer to a physical inspection area corresponding to the second pipeline network sub-graph.

In some embodiments, when the smart gas pipeline network security management platform 130 executes step 430, the second pipeline network sub-graph determined by the preset sub-graph segmentation manner may be determined as the inspection sub-area. For example, the smart gas pipeline network security management platform 130 may determine each second pipeline network sub-graph in the final second pipeline network sub-graph as an inspection sub-area.

Specifically, as shown in FIG. 4, the sub-graph 421, sub-graph 422, and sub-graph 423 correspond to three different inspection sub-areas. It may be understood that each final second pipeline network sub-graph corresponds to an actual gas pipeline network distribution. Correspondingly, referring to the final second pipe network sub-graph, the smart gas pipe network security management platform 130 can realize the generation of inspection sub-areas by corresponding the pipe network devices (such as gas pipelines, gate stations, and gas storage stations) corresponding to the nodes or edges in each final second pipe network sub-graph to the actual area.

In some embodiments of the present disclosure, the second pipe network diagram may be automatically segmented by the preset sub-graph segmentation manner, which can improve the efficiency of segmenting the second pipe network diagram. At the same time, the sub-graph complexity when dividing the second pipe network diagram may be taken into consideration, which can be conducive to a more balanced sub-graph of the divided second pipe network and a more balanced inspection workload of the further determined inspection sub-area.

It should be noted that the above descriptions about process 200, process 300 and process 400 are only for example and illustration, and do not limit the scope of application of the present disclosure. For those skilled in the art, various modifications and changes may be made to the process under the guidance of the present disclosure. However, these corrections and modifications are still within the scope of this disclosure.

Figure 5:
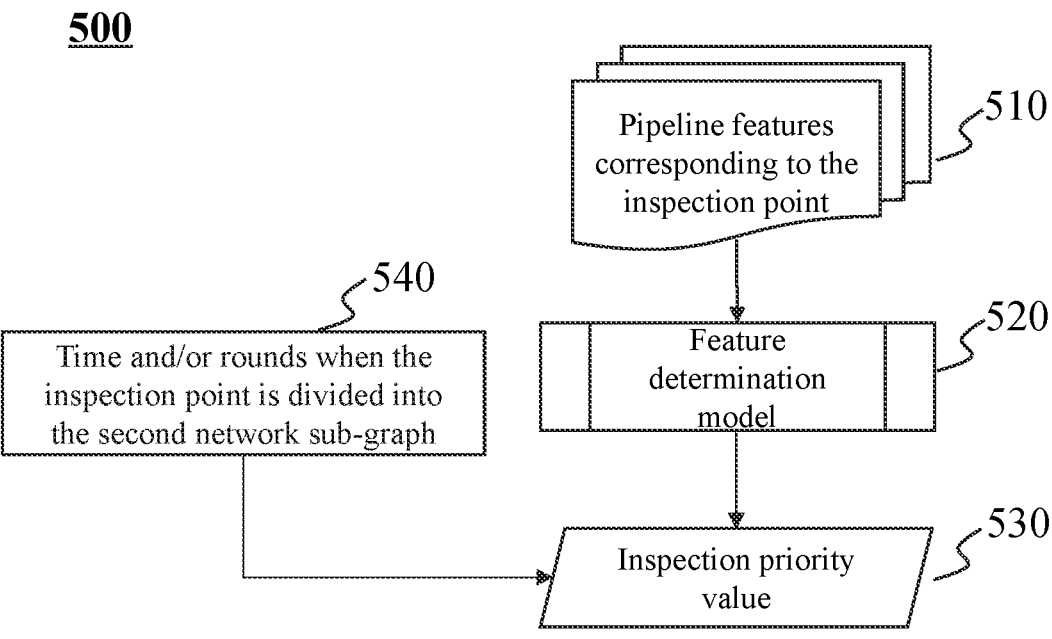
FIG. 5 is a schematic diagram illustrating an exemplary process for determining an inspection priority value of an inspection point according to some embodiments of the present disclosure.

FIG. 5 is a schematic diagram illustrating an exemplary process for determining an inspection priority value of an inspection point according to some embodiments of the present disclosure.

In some embodiments, each of the at least one inspection point may have an inspection priority value 530, and the inspection route may be determined based on the inspection priority value 530 of the each of the at least one inspection point.

The inspection priority value 530 may refer to a priority value for inspection personnel to an inspect inspection point. The inspection priority value 530 may be a value in the interval [0, 1], such as 0.3, 0.8. The larger the inspection priority value of the inspection point, the more priority to perform an inspection on the inspection point.

In some embodiments, the inspection priority value 530 may be determined based on the pipeline features 510 corresponding to the inspection point.

The pipeline features may refer to properties or information of gas pipeline. The pipeline features may include physical parameters of the gas pipeline, such as the material, length, thickness, and diameter of the gas pipeline, an area to which the gas pipeline belongs, etc. The pipeline features may also include operating parameters of the gas pipeline, such as gas composition, gas flow rate, gas pressure level, and gas transmission frequency delivered by the gas pipeline, etc. The pipeline features may also include other preset information, such as historical inspection times, failure rate, and maintenance records of the gas pipeline, etc.

In some embodiments, the smart gas pipeline network security management platform 130 may obtain the gas pipeline related information (e.g., physical parameters, operating parameters, etc.) stored in the smart gas data center 132, and determine the pipeline features based on the gas pipeline related information. In some embodiments, the pipeline features may be represented in various forms, for example, the pipeline features may be represented in forms including but not limited to vectors and vector matrixes. Exemplarily, the pipeline features may be represented by a vector of (a, b, c, d, c). The first element a of the vector represents the inspection sub-area where the gas pipeline is located, the second element b represents the length of the gas pipeline, the third element c represents the average daily gas flow, the fourth element d represents the gas pressure level, and the fifth element e represents the failure rate.

In some embodiments, the smart gas pipeline network security management platform 130 may determine the inspection priority value 530 of the inspection point through the feature determination model 520 based on the pipeline features 510 corresponding to the inspection point.

The feature determination model 520 may refer to a model for determining the inspection priority value 530 of the inspection point. The feature determination model 520 may be a trained machine learning model. For example, the feature determination model 520 may include a recurrent neural network model, a convolutional neural network, or other custom model structures, or the like, or any combination thereof.

As shown in FIG. 5, the input of the feature determination model 520 may include the pipeline features 510 corresponding to the inspection point, and based on the processing of the feature determination model 520, the inspection priority value 530 corresponding to the inspection point may be output.

In some embodiments, the feature determination model 520 may be obtained by training a large number of first training samples with labels. The first training sample may include a sample pipeline historical feature vector constructed based on multiple sets of historical gas pipeline related information. The multiple sets of gas pipeline related information may be obtained based on historical data stored in the smart gas data center. The label of the first training sample may be the inspection priority value of the inspection point corresponding to the historical feature vector of each sample pipeline. The labels may be labeled based on manual labeling or other feasible manners.

When training the feature determination model 520, the smart gas pipeline network security management platform 130 may input the sample pipeline historical feature vector into the feature determination model 520, construct a loss function based on the output of the feature determination model 520 and the label of the first training sample, and iteratively update the parameters of the initial feature determination model based on the loss function until a preset condition is met and the training is completed, thus obtaining a trained feature determination model. The preset condition may be that the loss function is smaller than the threshold, converges, or the training cycle reaches the threshold.

In some embodiments, the inspection priority value 530 of the inspection point may be also related to the time and/or rounds when the corresponding node and/or edge of the inspection point in the second pipe network diagram 413 is divided into sub-graphs in sub-graphs segment.

It should be noted that the pipeline features 510 corresponding to different inspection points may be the same, and the inspection priority value 530 output by the feature determination model 520 may be the same. In some embodiments, the inspection priority value 530 output by the feature determination model 520 may be used as a candidate inspection priority value.

In some embodiments, the smart gas pipeline network security management platform 130 may determine the final inspection priority value 530 of the inspection point based on the time and/or rounds 540 when the inspection point is divided into the second network sub-graph and the aforementioned candidate inspection priority value through preset inspection rules. The time and/or round 540 when the inspection point is divided into the second pipeline network sub-graph may be obtained based on the record of the iteration counter during the iteration of the sub-graph segmentation manner.

In some embodiments, a weight coefficient of the candidate inspection priority value may also be set, and the weight coefficient may be inversely proportional to the time and/or rounds when the inspection point is divided into the second pipeline network sub-graph. Exemplarily, the time and/or rounds when the inspection points are divided into the second pipeline network sub-graph is t, the weight coefficient k is 1/t, and the final inspection priority value V is k*V'; and V' is a candidate inspection priority value output by the feature-based determination model 520.

Exemplarily, as shown in FIG. 4, the inspection personnel is located at node n7 currently, and may go to node n5 or node n8. If the pipeline features of node n5 and node n8 are exactly the same and the node n8 is first selected as the node to be allocated and allocated to the sub-graph 421 in the iterative processing of the sub-graph segmentation manner, the node n8 may have a higher inspection priority value. At this time, the inspection route of the inspection personnel may be a route from node n7 to node n8, that is, the pipeline corresponding to edge L.

It may be understood that by introducing the time and/or rounds 540 when the inspection point is divided into the second pipe network sub-graph, when the inspection priority values 530 of the inspection points determined based on the pipeline features are the same in the same second pipe network sub-graph, the inspection points that are first divided into the second pipe network sub-graph can have higher inspection priority, thus eliminating the uncertainty of the inspection order.

In some embodiments of the present disclosure, determining the inspection priority value of the inspection point by the feature determination model, the inspection priority value of the inspection point can be determined automatically and in real time, which can improve efficiency. At the same time, introducing the time and/or rounds when the inspection point is divided into the sub-graph can eliminate the interference of the inspection priority order caused by the same pipeline features, which can make the inspection order of the inspection points clearer.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution. e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about". "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure.

Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for smart gas pipeline network inspection, implemented on a smart gas pipeline network security management platform based on an Internet of Things system for smart gas pipeline network inspection, and the method comprising:

obtaining a gas pipeline network distribution;

determining at least one inspection sub-area based on the gas pipeline network distribution, including:

determining at least one inspection personnel station based on the gas pipeline network distribution, including:

constructing a first pipeline network graph based on the gas pipeline network distribution, wherein nodes of the first pipeline network graph correspond to pipeline network branches in the gas pipeline network distribution; edges of the first pipeline network graph correspond to pipelines in the gas pipeline network distribution; and each edge of the first pipeline network graph corresponds to a pipeline connecting two pipeline network branches;

outputting, based on the nodes of the first pipeline network graph and/or the edges of the first pipeline network graph through a probability determination model, a probability that the nodes of the first pipeline network graph and/or the edges of the first pipeline network graph are inspection personnel stations, wherein the probability determination model is a trained graph neural network model, the probability determination model is obtained by training a plurality of sample pipeline network graphs with labels, and a label setting manner includes:

in each of the plurality of sample pipeline network graphs, setting a label of a node or an edge that is actually set as a inspection personnel station to 1; and setting values of labels of other nodes or edges in a range of [0,1] based on a preset attenuation degree;

a training process of the probability determination model includes:

inputting each sample pipeline network graph into the probability determination model;

obtaining a probability value of each node and edge as a inspection personnel station outputted by the probability determination model based on the each node and edge in the sample pipeline network graph;

constructing a loss function based on a label of each sample pipeline network graph and probability values outputted by the probability determination model; and obtaining a trained probability determination model until preset conditions are satisfied, wherein the preset conditions include the loss function being less than a first threshold, convergence, or the training cycle reaching a second threshold; and determining the at least one inspection personnel station based on an output of the nodes of the first pipeline network graph and the edges of the first pipeline network graph; and determining the at least one inspection sub-area based on the gas pipeline network distribution and the at least one inspection personnel station;

determining, based on the at least one inspection sub-area, an inspection plan for each of the at least one inspection sub-area, the inspection plan at least including an inspection frequency; and controlling at least one inspection engineering-related device to perform a corresponding inspection operation on a pipeline network device based on the inspection plan, wherein the at least one inspection engineering-related device includes an alarm device, and the pipeline network device includes the pipelines in the gas pipeline network distribution and gate stations.

2. The method according to claim 1, wherein the Internet of Things system for smart gas pipeline network inspection further includes a smart gas user platform, a smart gas service platform, a smart gas sensor network platform, and a smart gas object platform;

the smart gas object platform is configured to obtain the gas pipeline network distribution, and transmit the gas pipeline network distribution to the smart gas pipeline network security management platform through the smart gas sensor network platform; and the method further includes:

feeding back the inspection plan to the smart gas user platform based on the smart gas service platform.

3. The method according to claim 1, wherein the smart gas user platform includes a gas user sub-platform and a supervision user sub-platform;

the smart gas service platform includes a smart gas consumption service sub-platform corresponding to the gas user sub-platform and a smart supervision service sub-platform corresponding to the supervision user sub-platform;

the smart gas pipeline network security management platform includes a smart gas pipeline network inspection management sub-platform and a smart gas data center; wherein the smart gas pipeline network inspection management sub-platform includes an inspection plan management module, an inspection time warning module, an inspection status management module, and an inspection problem management module;

the smart gas sensor network platform includes a smart gas pipeline network device sensor network sub-platform and a smart gas pipeline network inspection engineering sensor network sub-platform; and the smart gas object platform includes a smart gas pipeline network device object sub-platform and a smart gas pipeline network inspection engineering object sub-platform.

4. The method of claim 3, wherein the method further includes:

sending the inspection plan to the supervision user sub-platform to unify scheduling and management of inspection personnel based on the inspection plan;

in response to determining that relevant data of the pipeline network device fluctuates abnormally, controlling the inspection plan management module to set and adjust the inspection plan of the pipeline network device to extend an inspection cycle and change an inspection route based on an original inspection plan;

sending an adjusted inspection plan to the supervision user sub-platform and the smart gas pipeline network inspection engineering object sub-platform to control the at least one inspection engineering-related device to inspect a gas pipeline based on the adjusted inspection plan, or guiding at least one inspection personnel to inspect the gas pipeline based on the adjusted inspection plan.

5. The method according to claim 1, wherein the inspection plan further includes an inspection route; the inspection sub-area includes an inspection personnel station and at least one inspection point; and the determining an inspection plan for each of the at least one inspection sub-area includes:

determining a route that traverses each of the at least one inspection point from the inspection personnel station in the inspection sub-area as the inspection route; and determining the inspection plan of the inspection sub-area based on the inspection route.

6. The method according to claim 5, wherein the each inspection point in the at least one inspection point has an inspection priority value; the inspection route is determined based on the inspection priority value of the each inspection point;

the inspection priority value is determined based on pipeline features corresponding to the inspection point; and the method further comprises:

controlling the at least one inspection engineering-related device to inspect a gas pipeline at the inspection point based on the inspection priority value of the each inspection point; or guiding at least one inspection personnel to inspect the gas pipeline at the inspection point based on the inspection priority value of the each inspection point.

7. The method according to claim 6, wherein the inspection priority value is determined based on pipeline features corresponding to the inspection point includes:

determining the inspection priority value of the inspection point through a feature determination model based on the pipeline features corresponding to the inspection point.

8. A non-transitory computer-readable storage medium storing computer instructions, wherein after reading the computer instructions in the storage medium, a computer executes the method for smart gas pipeline network inspection according to claim 1.

9. The method of claim 1, wherein the method further includes: determining a number of inspection personnel stations based on an average value of sub-graph complexity of a plurality of sub-graphs after a pipeline network sub-graph is divided; and setting up the inspection personnel stations based on the number of inspection personnel stations.

10. The method according to claim 1, wherein the determining the at least one inspection sub-area based on the gas pipeline network distribution and the at least one inspection personnel station includes:

constructing a second pipeline network graph based on the gas pipeline network distribution and the at least one inspection personnel station;

wherein nodes of the second pipeline network graph include pipeline network nodes and station nodes; the pipeline network nodes correspond to the pipeline network in the gas pipeline network distribution; the station nodes correspond to the at least one inspection personnel station; and edges of the second pipeline network graph correspond to the pipelines in the gas pipeline network distribution;

determining at least one second pipeline network sub-graph by a preset sub-graph segmentation manner based on the second pipeline network graph; and determining the at least one inspection sub-area based on the at least one second pipeline network sub-graph.

11. The method according to claim 10, wherein the preset sub-graph segmentation manner includes:

determining at least one initial second pipeline network sub-graph based on the station nodes of the second pipeline network graph; wherein each of the at least one initial second pipeline network sub-graph includes a station node;

using the pipeline network nodes of the second pipeline network graph as nodes to be allocated, and selecting a target node from the nodes to be allocated based on a preset screening manner;

determining an initial second pipeline network sub-graph to which the target node belongs based on a target function value of each initial second pipeline network sub-graph corresponding to the target node;

determining a new target node and repeating above operations until the initial second pipeline network sub-graphs to which all the nodes to be allocated belong are determined; and using the each initial second pipeline network sub-graph after foregoing operations are completed as a final second pipeline network sub-graph for determining a corresponding inspection sub-area.

12. An Internet of Things system for smart gas pipeline network inspection, comprising: a smart gas user platform, a smart gas service platform, a smart gas pipeline network security management platform, a smart gas sensor network platform, and a smart gas object platform; wherein the smart gas object platform is configured to obtain a gas pipeline network distribution, and transmit the gas pipeline network distribution to the smart gas pipeline network security management platform through the smart gas sensor network platform;

the smart gas pipeline network security management platform is configured to:

determine at least one inspection sub-area based on the gas pipeline network distribution; wherein to determine the at least one inspection sub-area based on the gas pipeline network distribution, the smart gas pipeline network security management platform is further configured to:

determine at least one inspection personnel station based on the gas pipeline network distribution, wherein to determine the at least one inspection personnel station based on the gas pipeline network distribution, the smart gas pipeline network security management platform is further configured to:

construct a first pipeline network graph based on the gas pipeline network distribution, wherein the nodes of the first pipeline network graph correspond to pipeline network branches in the gas pipeline network distribution; edges of the first pipeline network graph correspond to pipelines in the gas pipeline network distribution; and each edge of the first pipeline network graph corresponds to a pipeline connecting two pipeline network branches;

output, based on the nodes of the first pipeline network graph and/or the edges of the first pipeline network graph through a probability determination model, a probability that the nodes of the first pipeline network graph and/or the edges of the first pipeline network graph are inspection personnel stations, wherein the probability determination model is a trained graph neural network model, the probability determination model is obtained by training a plurality of sample pipeline network graphs with labels, and a label setting manner includes: in each of the plurality of sample pipeline network graphs, setting a label of a node or an edge that is actually set as a inspection personnel station to 1; and setting values of labels of other nodes or edges in a range of [0,1], based on a preset attenuation degree;

a training process of the probability determination model includes:

inputting each sample pipeline network graph into the probability determination model;

obtaining a probability value of each node and edge as a inspection personnel station outputted by the probability determination model based on the each node and edge in the sample pipeline network graph;

constructing a loss function based on a label of each sample pipeline network graph and probability values outputted by the probability determination model; and obtaining a trained probability determination model until preset conditions are satisfied, wherein the preset conditions include the loss function being less than a first threshold, convergence, or the training cycle reaching a second threshold; and determine the at least one inspection personnel station based on an output of the nodes of the first pipeline network graph and the edges of the first pipeline network graph; and determine the at least one inspection sub-area based on the gas pipeline network distribution and the at least one inspection personnel station;

determine, based on the at least one inspection sub-area, an inspection plan for each of the at least one inspection sub-area, the inspection plan at least including an inspection frequency; and control at least one inspection engineering-related device to perform a corresponding inspection operation on a pipeline network device based on the inspection plan, wherein the at least one inspection engineering-related device includes an alarm device, and the pipeline network device includes the pipelines in the gas pipeline network distribution and gate stations;

the smart gas service platform is configured to feed back the inspection plan to the smart gas user platform.

13. The Internet of Things system according to claim 12, wherein the smart gas user platform includes a gas user sub-platform and a supervision user sub-platform;

the smart gas service platform includes a smart gas consumption service sub-platform corresponding to the gas user sub-platform and a smart supervision service sub-platform corresponding to the supervision user sub-platform;

the smart gas pipeline network security management platform includes a smart gas pipeline network inspection management sub-platform and a smart gas data center; wherein the smart gas pipeline network inspection management sub-platform includes an inspection plan management module, an inspection time warning module, an inspection status management module, and an inspection problem management module;

the smart gas sensor network platform includes a smart gas pipeline network device sensor network sub-platform and a smart gas pipeline network inspection engineering sensor network sub-platform; and the smart gas object platform includes a smart gas pipeline network device object sub-platform and a smart gas pipeline network inspection engineering object sub-platform.

14. The Internet of Things system according to claim 13, wherein the inspection plan management module is configured to:

set and adjust the inspection plan of the pipeline network device, and send the inspection plan based on the smart gas data center through the smart gas pipeline network inspection engineering sensor network sub-platform to the smart gas pipeline network inspection engineering object sub-platform; and send a inspection plan that affects gas consumption of users to the gas user sub-platform through the smart gas consumption service sub-platform through the smart gas data center; and the inspection time management module is configured to:

arrange a inspection plan that is not executed according to an inspection time, and prompt and alarm based on a preset time threshold; and generate an inspection reminder instruction, and send the inspection reminder instruction to the smart gas pipeline network inspection engineering object sub-platform through the smart gas pipeline network inspection engineering sensor network sub-platform based on the smart gas data center.

15. The Internet of Things system according to claim 12, wherein the smart gas pipeline network security management platform is further configured to:

construct a second pipeline network graph based on the gas pipeline network distribution and the at least one inspection personnel station;

wherein nodes of the second pipeline network graph include pipeline network nodes and station nodes; the pipeline network nodes correspond to the pipeline network in the gas pipeline network distribution; the station nodes correspond to the at least one inspection personnel station; and edges of the second pipeline network graph correspond to the pipelines in the gas pipeline network distribution;

determine at least one second pipeline network sub-graph by a preset sub-graph segmentation manner based on the second pipeline network graph; and determine the at least one inspection sub-area based on the at least one second pipeline network sub-graph.

16. The Internet of Things system according to claim 12, wherein the inspection plan further includes an inspection route; the inspection sub-area includes an inspection personnel station and at least one inspection point; and the smart gas pipeline network security management platform is further configured to:

determine a route that traverses each of the at least one inspection point from the inspection personnel station in the inspection sub-area as the inspection route; and determining the inspection plan of the inspection sub-area based on the inspection route.

17. The system of claim 16, wherein the each inspection point in the at least one inspection point has an inspection priority value; the inspection route is determined based on the inspection priority value of the each inspection point; and the inspection priority value is determined based on pipeline features corresponding to the inspection point; and the smart gas pipeline network security management platform is further configured to:

control the at least one inspection engineering-related device to inspect a gas pipeline at the inspection point based on the inspection priority value of the each inspection point; or guide at least one inspection personnel to inspect the gas pipeline at the inspection point based on the inspection priority value of the each inspection point.

18. The Internet of Things system according to claim 17, wherein the smart gas pipeline network security management platform is further configured to:

determine the inspection priority value of the inspection point through a feature determination model based on the pipeline features corresponding to the inspection point.

\* \* \* \* \*